(12) United States Patent  (10) Patent No.: US 12,194,585 B2
Narayan  (45) Date of Patent: *Jan. 14, 2025

(54) SYSTEMS AND METHODS FOR MULTI-HOLE ASSEMBLIES WITH ANGULAR ADJUSTMENT AND LOCKING

(71) Applicant: GOODRICH CORPORATION, Charlotte, NC (US)

(72) Inventor: Karthik Narayan, Milton (CA)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/305,212

(22) Filed: Apr. 21, 2023

(65) Prior Publication Data

US 2023/0249301 A1 Aug. 10, 2023

Related U.S. Application Data

(63) Continuation of application No. 16/893,017, filed on Jun. 4, 2020.

(51) Int. Cl.
*B23Q 3/18* (2006.01)
*B25B 5/00* (2006.01)
*F16B 5/02* (2006.01)

(52) U.S. Cl.
CPC ............ *B23Q 3/186* (2013.01); *B25B 5/003* (2013.01); *F16B 5/0225* (2013.01); *F16B 5/025* (2013.01)

(58) Field of Classification Search
CPC ........ F16B 19/02; F16B 5/025; F16B 5/0225; F16B 5/0216; F16B 5/0258; F16B 2043/008; F16B 12/2027; F16B 12/2036; F16C 23/10; Y10T 403/75; Y10T 403/32155; B23Q 1/0072; B23Q 3/183; B23Q 3/186; B23Q 16/00; B23Q 16/021
See application file for complete search history.

(56) References Cited

U.S. PATENT DOCUMENTS

| 306,972 | A | * | 10/1884 | Stiles | F16C 7/06 74/571.1 |
|---|---|---|---|---|---|
| 2,216,208 | A | * | 10/1940 | Joseph | B21D 28/34 403/DIG. 8 |
| 4,309,123 | A |  | 1/1982 | Moore | |
| 5,141,357 | A |  | 8/1992 | Sherman | |
| 6,050,034 | A |  | 4/2000 | Krinner | |
| 6,206,355 | B1 |  | 3/2001 | Lichtenberg | |
| 6,322,063 | B1 |  | 11/2001 | Steinhart | |

(Continued)

OTHER PUBLICATIONS

European Patent Office, European Search Report dated Oct. 18, 2022 in Application No. 22181871.9.

(Continued)

*Primary Examiner* — Makena S Markman
(74) *Attorney, Agent, or Firm* — SNELL & WILMER L.L.P.

(57) ABSTRACT

A dual-sleeve, locking adjustment arrangement includes a position-sensitive component comprising an aperture, an outer eccentric sleeve disposed in the aperture, and an inner eccentric sleeve disposed in the outer sleeve. Rotation of the outer sleeve with respect to the position-sensitive component and the inner sleeve drives rotation of the position-sensitive component to adjust an angular position of the component.

19 Claims, 7 Drawing Sheets

(56) References Cited

U.S. PATENT DOCUMENTS

| | | | |
|---|---|---|---|
| 6,609,335 B1* | 8/2003 | Hyakkoku | E05F 5/02 |
| | | | 16/229 |
| 6,848,853 B2 | 2/2005 | Yamada | |
| 9,920,859 B2 | 3/2018 | Perrigo et al. | |
| 10,465,726 B2 | 11/2019 | Mongeau | |
| 11,660,716 B2* | 5/2023 | Narayan | B25B 5/003 |
| | | | 269/95 |
| 2002/0133950 A1* | 9/2002 | Bullard | B23P 19/12 |
| | | | 29/898.07 |
| 2003/0202839 A1 | 10/2003 | Yamada | |
| 2006/0088398 A1* | 4/2006 | Lund | F16B 5/0225 |
| | | | 411/398 |
| 2009/0180831 A1 | 7/2009 | Kendall | |
| 2016/0046001 A1 | 2/2016 | Clark et al. | |
| 2017/0356479 A1* | 12/2017 | Dominguez | F16B 35/005 |
| 2020/0096027 A1 | 3/2020 | Mongeau | |

OTHER PUBLICATIONS

European Patent Office, European Search Report dated Oct. 18, 2022 in Application No. 22181948.5.
European Patent Office, European Search Report dated Oct. 22, 2021 in Application No. 21177077.1.
Jspto, Restriction/Election Requirement dated Nov. 24, 2021 in U.S. Appl. No. 16/893,017.
Uspto, Pre-Interview First Office Action dated May 26, 2022 in U.S. Appl. No. 16/893,017.
Uspto, First Action Interview Office Action dated Jul. 14, 2022 in U.S. Appl. No. 16/893,017.
Uspto, Notice of Allowance dated Jan. 25, 2023 in U.S. Appl. No. 16/893,017.
European Patent Office, European Office Action dated Oct. 10, 2023 in Application No. 22181948.5.
European Patent Office, European Office Action dated Oct. 10, 2023 in Application No. 22181871.9.

* cited by examiner

400

```
┌─────────────────────────────────────────────────────┐
│ Disposing a first sleeve comprising a first eccentric aperture │
│ into a first aperture disposed in a position-sensitive          │ —— 410
│ component                                                        │
└─────────────────────────────────────────────────────┘
                             │
                             ▼
┌─────────────────────────────────────────────────────┐
│ Disposing a second sleeve comprising a second eccentric         │
│ aperture into the first eccentric aperture                       │ —— 420
└─────────────────────────────────────────────────────┘
                             │
                             ▼
┌─────────────────────────────────────────────────────┐
│ Rotating the first sleeve with respect to the second sleeve to  │
│ adjust an angular position of the position-sensitive             │ —— 430
│ component                                                        │
└─────────────────────────────────────────────────────┘
```

FIG. 4

SYSTEMS AND METHODS FOR MULTI-HOLE ASSEMBLIES WITH ANGULAR ADJUSTMENT AND LOCKING

CROSS-REFERENCE TO RELATED APPLICATIONS

This application is a continuation of, claims priority to, U.S. application Ser. No. 16/893,017, filed Jun. 4, 2020 and titled "SYSTEMS AND METHODS FOR MULTI-HOLE ASSEMBLIES WITH ANGULAR ADJUSTMENT AND LOCKING" BACKGROUND" which is incorporated by reference herein in its entirety for all purposes.

FIELD

Multi-hole components are coupled to adjacent structures using various methods. Typically, a first hole of the component is aligned with a first bolt and a second hole of the component is aligned with a second bolt. Therefore, it is desirable to manufacture corresponding holes to align with each other to ensure the parts fit together. Such arrangements may need tight tolerances to ensure that the holes align. One way around tight tolerances is to manufacture over-sized bolt holes to ensure sufficient clearance to compensate for misalignment of bolt axes; bolts are then inserted and tightened with the component in the correct angular position. Another way, which also provides angular adjustment of a part, is to manufacture elongated slots into which bolts are inserted and tightened with the component at the correct angular position. Both these arrangements are vulnerable to potentially-undesirable angular free-play in the event that bolt preload is not properly achieved during installation, or is lost during service.

SUMMARY

An adjusting arrangement is disclosed, comprising a position-sensitive component comprising a first aperture and a second aperture, a first sleeve comprising a first eccentric aperture, wherein the position-sensitive component is configured to receive the first sleeve in the first aperture, a second sleeve comprising a second eccentric aperture, wherein the first sleeve is configured to receive the second sleeve in the first eccentric aperture, a first rod configured to extend through the first aperture, the first rod comprising a first centerline axis, and a second rod configured to extend through the second aperture, the second rod comprising a second centerline axis. Rotation of the first sleeve with respect to the position-sensitive component and the second sleeve is configured to drive rotation of the position-sensitive component about the second centerline axis.

In various embodiments, the first centerline axis is parallel to the second centerline axis.

In various embodiments, the first sleeve is friction fit into the first aperture.

In various embodiments, the adjusting arrangement further comprises a relief cut disposed in the position-sensitive component, the relief cut forming two opposing fingers whereby a size of the first aperture is adjustable for compressing and releasing the first sleeve.

In various embodiments, the two opposing fingers are pulled apart to release the first sleeve.

In various embodiments, an inner diameter of the first aperture is less than an outer diameter of the first sleeve in response to the two opposing fingers being in a natural state.

In various embodiments, the adjusting arrangement further comprises a mounting structure, wherein the first rod and the second rod are coupled to the mounting structure.

In various embodiments, a first diameter of the first aperture of the position-sensitive component is greater than a second diameter of the second aperture of the position-sensitive component.

In various embodiments, the adjusting arrangement further comprises a nut configured to thread onto the first rod to secure the second sleeve within the first sleeve.

A locking adjusting arrangement is disclosed, comprising, a position-sensitive component comprising a first aperture disposed in a body of the position-sensitive component, wherein the body comprises opposing fingers at least partially defining the first aperture, a first sleeve comprising a first eccentric aperture, wherein the first sleeve is configured to be received into the first aperture, and a second sleeve comprising a second eccentric aperture, wherein the second sleeve is configured to be received into the first eccentric aperture, and wherein the first sleeve is compressed between the opposing fingers thereby providing a friction lock to maintain a relative angle of the first sleeve with respect to the position-sensitive component.

In various embodiments, rotation of the first sleeve with respect to the position-sensitive component and the second sleeve is configured to drive rotation of the position-sensitive component.

In various embodiments, the first sleeve comprises a rotation assistance feature.

In various embodiments, a diameter of the first aperture is less than a diameter of the first sleeve in response to the opposing fingers moving to a natural state.

In various embodiments, the body and the opposing fingers comprise a single, monolithic structure.

In various embodiments, the locking adjusting arrangement further comprises a first rod, wherein the second eccentric aperture is configured to receive the first rod.

In various embodiments, the locking adjusting arrangement further comprises a second aperture disposed in the body, and a second rod, wherein the second aperture is configured to receive the second rod.

A method for installing a position-sensitive component is disclosed, comprising disposing a first sleeve comprising a first eccentric aperture into a first aperture disposed in the position-sensitive component, disposing a second sleeve comprising a second eccentric aperture into the first eccentric aperture, and rotating the first sleeve with respect to the second sleeve to adjust an angular position of the position-sensitive component.

In various embodiments, the method further comprises disposing a first rod to extend through the second eccentric aperture.

In various embodiments, the method further comprises expanding opposing fingers of the position sensitive component to enlarge the first aperture before moving the first sleeve into the first aperture.

In various embodiments, the method further comprises disposing a second rod to extend through a second aperture disposed in the position-sensitive component.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The accompanying drawings illustrate various embodiments employing the principles described herein and are a part of this specification. The illustrated embodiments are meant for description only, and they do not limit the scope of the claims, and in which:

FIG. 4 illustrates a flow chart for a method for installing a position-sensitive component, in accordance with various embodiments;

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein described without departing from the scope and spirit of the disclosure. Thus, the detailed description herein is presented for purposes of illustration only and not of limitation.

Provided herein, according to various embodiments, are systems and methods for angular adjustment and locking of position-sensitive components, such as within the landing gear of an aircraft. While various details are included herein pertaining to aircraft components, such as landing gear components, the systems and methods disclosed herein can be applied to any component where precise angular position is desired.

Systems and methods of the present disclosure provide a step-less adjustment arrangement for achieving a precise angular position. A dual sleeve arrangement is provided, wherein rotation of an outer eccentric sleeve with respect to an inner eccentric sleeve and the position-sensitive component drives rotation of the position-sensitive component. Opposing fingers may clamp around the outer eccentric sleeve to lock the dual-sleeve assembly to lock the position-sensitive component in place. Systems and methods of the present disclosure provide the ability to maintain tight clearances in a multi-hole assembly, thereby reducing potential of excessive free play. Systems and methods of the present disclosure provide the ability to retrofit parts in service where holes in one component may have significant variation in distance between said holes.

Figure 1:
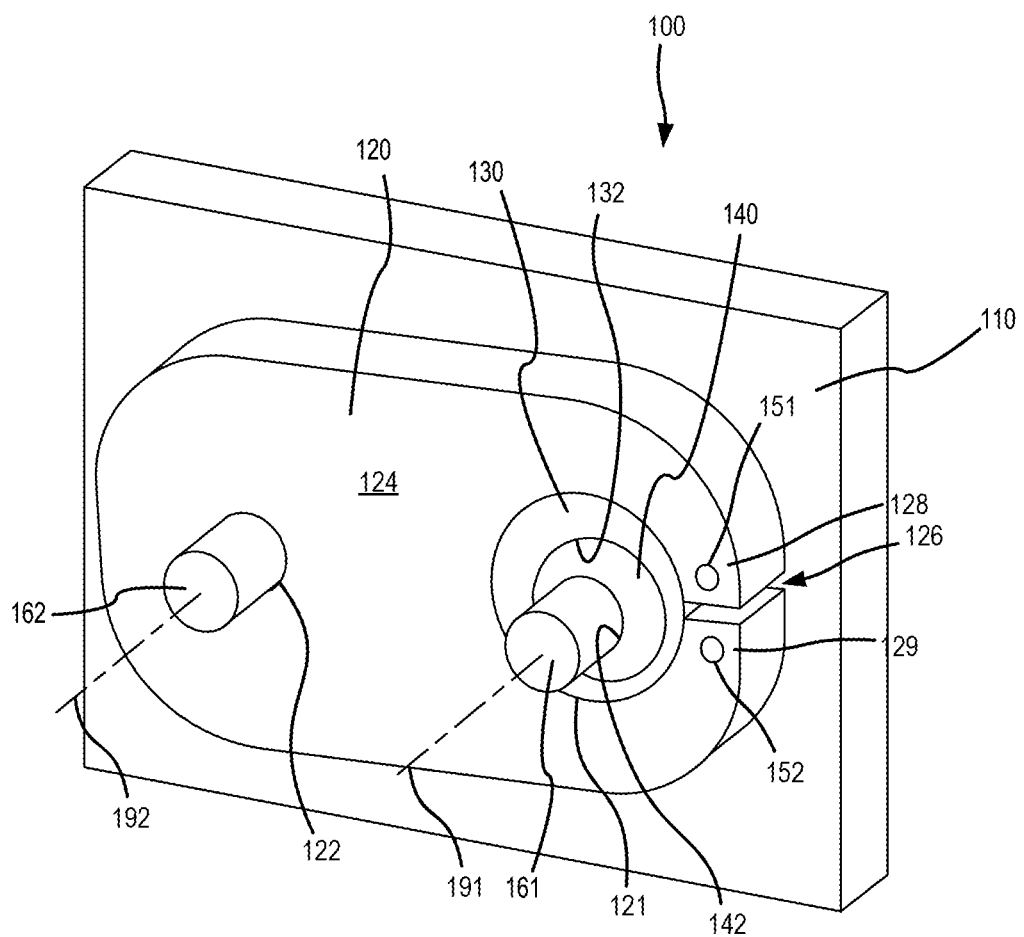
FIG. 1 illustrates a dual-sleeve adjusting arrangement comprising an inner eccentric sleeve and an outer eccentric sleeve, in accordance with various embodiments.

With reference to FIG. 1, a dual-sleeve adjusting arrangement 100 (also referred to herein as a locking adjusting arrangement, an adjusting arrangement, or an arrangement) for a position-sensitive component 120 (also referred to herein as a component) is illustrated, in accordance with various embodiments. Arrangement 100 generally comprises the component 120, a first eccentric sleeve 130 (also referred to herein as a first sleeve), and a second eccentric sleeve 140 (also referred to herein as a second sleeve). Component 120 may be adjustably mounted to a mounting structure 110 via a first rod 161 and a second rod 162. Component 120 may be rotatably coupled to second rod 162. Second rod 162 may comprise a centerline axis 192. Aperture 122 (also referred to herein as a second aperture) and rod 162 may be coaxially aligned. As described herein in further detail, component 120 may rotate about centerline axis 192 in response to rotation of first sleeve 130 and/or second sleeve 140.

Component 120 may be any type of component for which fine adjustment is desired during installation. Furthermore, arrangement 100 may allow for the relative positions of first rod 161 and second rod 162 to be installed without highly precise tolerances. One example of a position-sensitive component 120 is an aircraft landing gear sensor system used to detect an angular position of a landing gear component based upon the relative position of a sensor and sensor target. The sensor may detect movement of the target and an angular position of a landing gear component may be determined based on the position of the target. The relative position of the sensor and the target may be important to the function of the sensor system. For example, it may be desirable to have the target and the sensor parallel to each other and/or at a predetermined distance from each other. Therefore, it may be desirable to adjust or fine tune the angular position of the sensor and/or target during installation. In this regard, component 120 may comprise a sensor or a sensor target, such as an electro-optical sensor, a reflective surface, a variable inductance proximity sensor, or a ferromagnetic target, among other types of sensors and sensor targets or the like, in accordance with various embodiments.

First sleeve 130 may comprise a round outer diameter surface and an eccentric aperture 132 (also referred to herein as a first eccentric aperture). A first aperture 121 may be disposed in the body 124 of component 120. First aperture 121 may be configured to receive first sleeve 130. In various embodiments, body 124 of component 120 may further comprise a relief cut 126. Relief cut 126 may form two opposing fingers (i.e., finger 128 and finger 129) whereby a size of the first aperture 121 is adjustable for compressing and releasing the first sleeve 130. Body 124 and the opposing fingers 128, 129 may comprise a single, monolithic structure. In various embodiments, the inner diameter of first aperture 121 is less than the outer diameter of first sleeve 130 in response to finger 128 and finger 129 being in a natural, unflexed, relaxed state. However, finger 128 and finger 129 may be pulled apart or flexed, thereby increasing the width of relief cut 126 to increase the diameter of first aperture 121. In various embodiments, finger 128 may comprise an aperture 151 and finger 129 may comprise an opposing aperture 152. A tool, such as snap ring plier type tool, may be inserted into aperture 151 and aperture 152 for expanding fingers 128, 129. With the fingers 128, 129 pulled apart, first sleeve 130 may be placed in first aperture 121. With first sleeve 130 in first aperture 121, the fingers 128, 129 may be released to reduce the width of relief cut 126 and compress first sleeve 130 in first aperture 121. Conversely, and with first sleeve 130 in first aperture 121, the fingers 128, 129 may be pulled or flexed apart to increase the width of relief cut 126 and release the friction lock of first sleeve 130 in first aperture 121 for removal of first sleeve 130 or for rotating first sleeve 130 with respect to component 120. Thus, the fingers 128, 129 may provide a friction lock to secure the angular position of first sleeve 130 with respect to component 120 without additional hardware. Stated differently, first sleeve 130 may be friction fit into aperture 121.

Second sleeve 140 may comprise a round outer diameter surface and an eccentric aperture 142 (also referred to herein as a second eccentric aperture). Eccentric aperture 132 may be configured to receive second sleeve 140. The inner diameter surface of first sleeve 130 may be complementary to the outer diameter surface of second sleeve 140. First sleeve 130 may be configured to rotate within, and with respect to, second sleeve 140. The diameter of eccentric aperture 132 may be substantially equal to or slightly greater than the outer diameter of second sleeve 140. In various embodiments, the diameter of eccentric aperture 132 is between zero and ten thousands of an inch greater than the outer diameter of second sleeve 140. In various embodiments, the diameter of eccentric aperture 132 is between one tenth of a thousandth inch and four thousands of an inch greater than the outer diameter of second sleeve 140. In this manner, movement or "play" of second sleeve 140 within first sleeve 130 is mitigated, while still allowing second sleeve 140 to rotate within eccentric aperture 132.

In various embodiments, first sleeve 130 and/or second sleeve 140 may be made from plastic, metal, composite materials, or any other suitable material. In various embodiments, first sleeve 130 and/or second sleeve 140 may be made from a metal or metal alloy, such as cast iron, steel, stainless steel, austenitic stainless steels, ferritic stainless steels, martensitic stainless steels, titanium, titanium alloys, aluminum, aluminum alloys, galvanized steel, copper alloys, or any other suitable metal or metal alloy. In various embodiments, first sleeve 130 and/or second sleeve 140 may be made from a plastic material, such as a thermoplastic, a polyethylene-based material, a polyvinyl chloride (PVC), among others.

First rod 161 may extend through eccentric aperture 142. First rod 161 may comprise a centerline axis 191. In various embodiments, centerline axis 191 is parallel to centerline axis 192. Second sleeve 140 may rotate about first rod 161. The diameter of eccentric aperture 142 may be substantially equal to or slightly greater than the outer diameter of first rod 161. In this manner, movement or "play" of component 120 about second rod 162 is mitigated, while still allowing second sleeve 140 to rotate with respect to first rod 161 during angular positioning of component 120. Stated differently, second sleeve 140 may be rotatably coupled to rod 161. Second rod 162 may extend through aperture 122. The diameter of aperture 122 may be substantially equal to or slightly greater than the outer diameter of second rod 162. In this manner, movement or "play" of second sleeve 140 about first rod 161 is mitigated. In various embodiments, first rod 161 and second rod 162 are mounted to mounting structure 110. In various embodiments, the relative position of first rod 161 and second rod 162 is fixed.

Figure 2A:
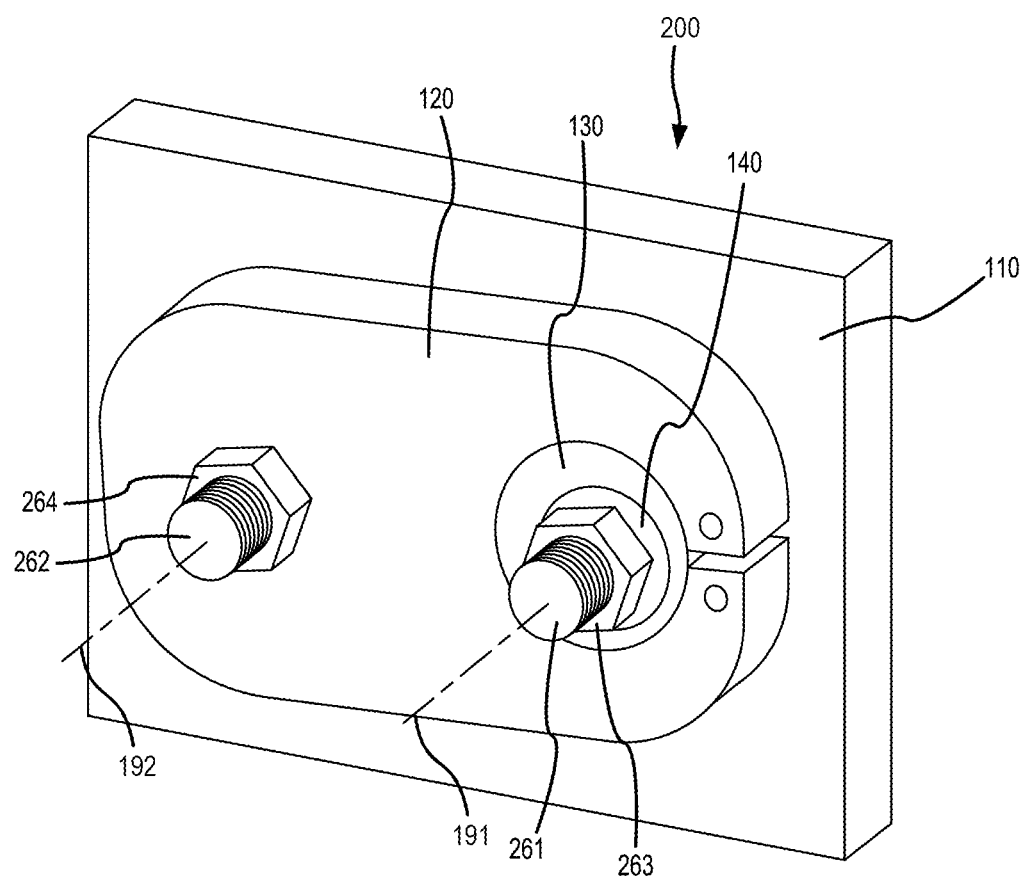
FIG. 2A illustrates a dual-sleeve adjusting arrangement comprising threaded rods and corresponding nuts for securing a position-sensitive component to a mounting structure, in accordance with various embodiments.
Figure 2B:
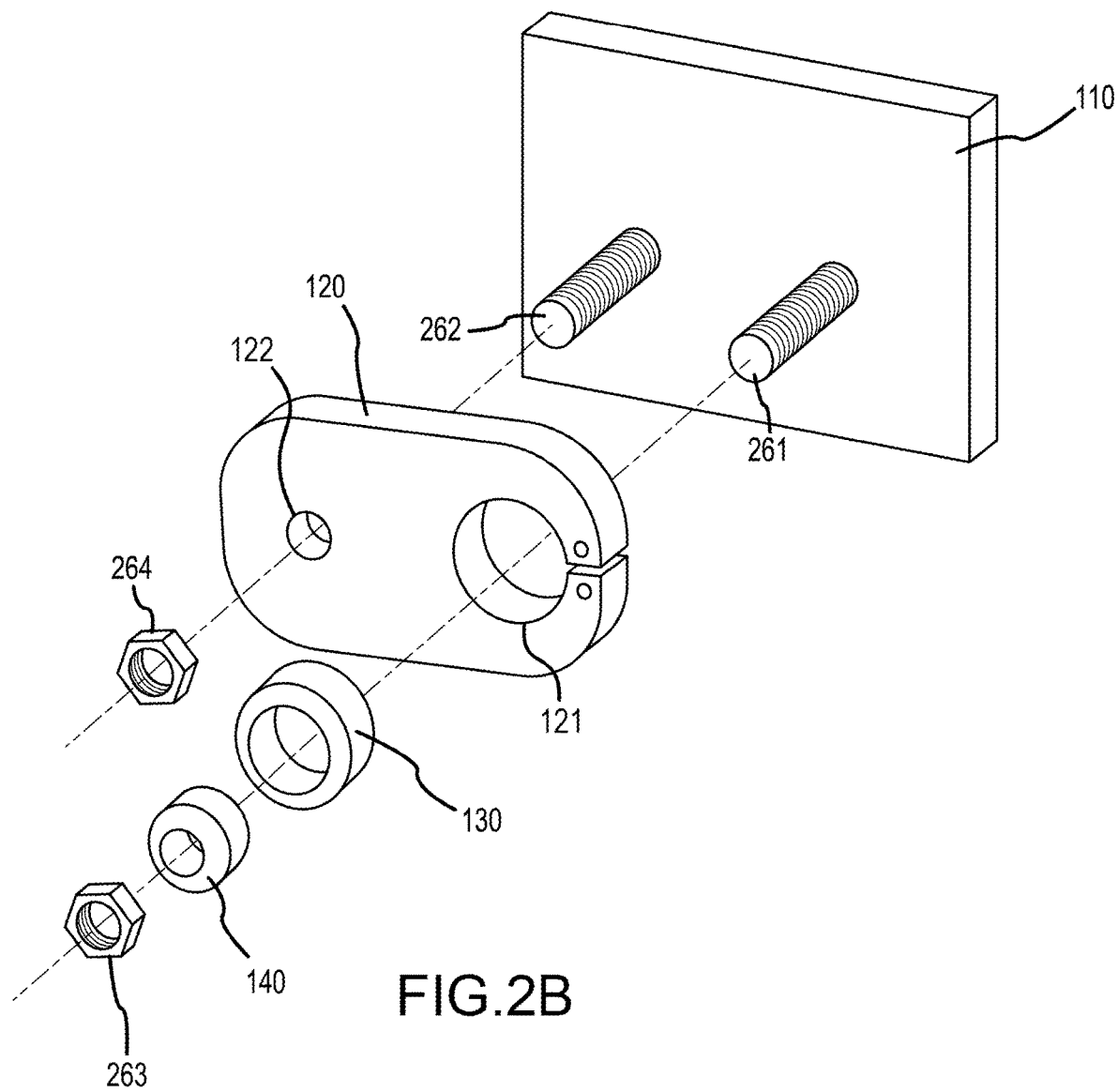
FIG. 2B illustrates an exploded view of the dual-sleeve adjusting arrangement of FIG. 2A, in accordance with various embodiments.

With respect to FIG. 2A and FIG. 2B, elements with like element numbering, as depicted in FIG. 1, are intended to be the same and will not necessarily be repeated for the sake of clarity.

With reference to FIG. 2A and FIG. 2B, a dual-sleeve adjusting arrangement 200 is illustrated, in accordance with various embodiments. Arrangement 200 may be similar to arrangement 100, except that first rod 261 and/or second rod 262 may each comprise a threaded bolt for receiving a first nut 263 and a second nut 264, respectively, to secure component 120 to mounting structure 110 after achieving the desired angular orientation, in accordance with various embodiments. First nut 263 may be configured to thread onto the first rod 261 to secure the second sleeve 140 within the first sleeve 130 (i.e., to prevent second sleeve 140 from translating along centerline axis 191 with respect to first sleeve 130).

Figure 3A:
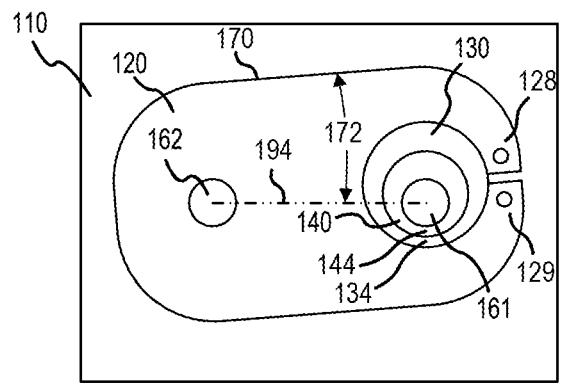
FIG. 3A, FIG. 3B, FIG. 3C, and FIG. 3D illustrate the dual-sleeve adjusting arrangement of FIG. 1 at various angular positions, in accordance with various embodiments.

With reference to FIG. 3A, arrangement 100 is illustrated with the component 120 rotated to a first maximum angular position. Component 120 is shown with a target surface 170 rotated to an angle 172 with respect to an imaginary reference line 194 extending from centerline axis 191 to centerline axis 192. Target surface 170 may be at a maximum angle 172 in response to first sleeve 130 being rotated with respect to second sleeve 140 such that a location 134 of minimum wall thickness of the first sleeve 130 is aligned with and in contact with a location 144 of minimum wall thickness of the second sleeve 140, in accordance with various embodiments.

Figure 3B:
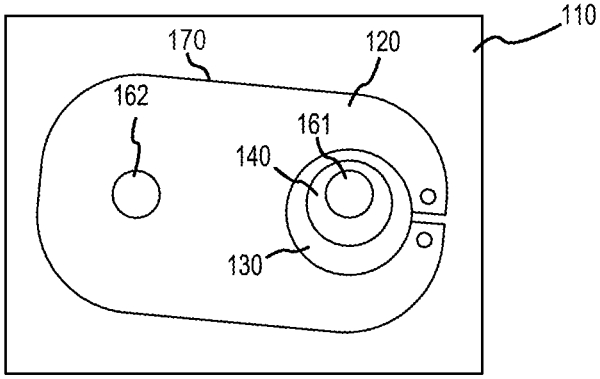

With reference to FIG. 3B, arrangement 100 is illustrated with the component 120 rotated to a second maximum angular position. In the illustrated embodiment, component 120 is rotated in an opposite direction as component 120 depicted in FIG. 3A.

Figure 3C:
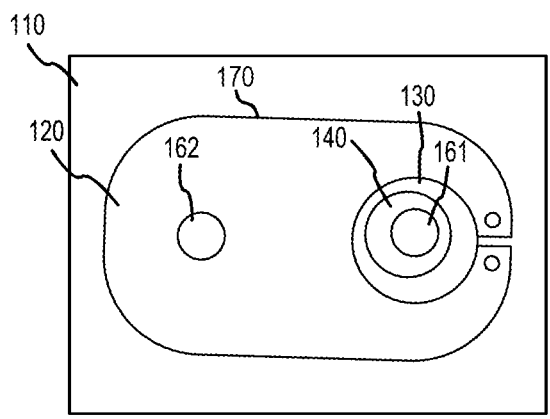

With reference to FIG. 3C, arrangement 100 is illustrated with the component 120 rotated to an intermediate angular position.

Figure 3D:
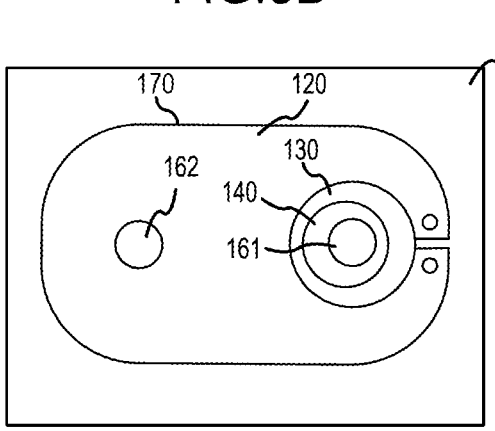

With reference to FIG. 3D, arrangement 100 is illustrated with the component 120 rotated to an intermediate angular position. Target surface 170 may be parallel with imaginary reference line 194 in response to first sleeve 130 being rotated with respect to second sleeve 140 such that the location 134 of minimum wall thickness of the first sleeve 130 is disposed opposite rod 161 from the location 144 of minimum wall thickness of the second sleeve 140, in accordance with various embodiments.

With reference to FIG. 4, a flow chart for a method 400 for installing a position-sensitive component is illustrated, in accordance with various embodiments. Method 400 includes disposing a first sleeve comprising a first eccentric aperture into a first aperture disposed in the position-sensitive component (step 410). Method 400 includes disposing a second sleeve comprising a second eccentric aperture into the first eccentric aperture (step 420). Method 400 includes rotating the first sleeve with respect to the second sleeve to adjust an angular position of the position-sensitive component (step 430).

With combined reference to FIG. 1 and FIG. 4, step 410 may include moving first sleeve 130 into first aperture 121. Step 420 may include moving second sleeve 140 into first eccentric aperture 132. Step 430 may include rotating the first sleeve with respect to the second sleeve to adjust an angular position of the position-sensitive component (step 430). The method 400 may further include disposing first rod 161 to extend through second eccentric aperture 142. The method 400 may further include disposing second rod 162 to extend through aperture 122.

With combined reference to FIG. 1, and FIG. 4, step 430 may include pulling apart finger 128 and finger 129 to increase the width of relief cut 126 and increase the diameter of first aperture 121. With opposing forces applied to fingers 128, 129, a torsional force—e.g., by hand or with a tool—may be applied to first sleeve 130 to rotate first sleeve 130 with respect to component 120. With both rod 161 and rod 162 fixed to mounting structure 110, as first sleeve 130 rotates with respect to component 120, second sleeve 140 counter-rotates with respect to first sleeve 130, and component 120 to rotate about second rod 162. In this regard, torsion applied to first sleeve 130 causes first sleeve 130 to rotate with respect to both second sleeve 140 and component 120. Stated differently, rotation of the first sleeve 130 with respect to component 120 may be configured to drive rotation of component 120 about second rod 162. For example, first sleeve 130 may be rotated from a first position, as illustrated in FIG. 3A for example, to a second position, as illustrated in FIG. 3B for example, to adjust the angular position of component 120. When a desired angular position is achieved, finger 128 and finger 129 may be released to lock first sleeve 130 in first aperture 121. With first sleeve 130 locked from rotation with respect to component 120, first rod 161 locks second sleeve 140 from rotation. Stated differently, the angular position of component 120 may be locked in response to first sleeve 130 being locked to component 120. In this regard, locking first sleeve 130 from rotation within component 120 locks the entire arrangement from rotation.

Figure 5:
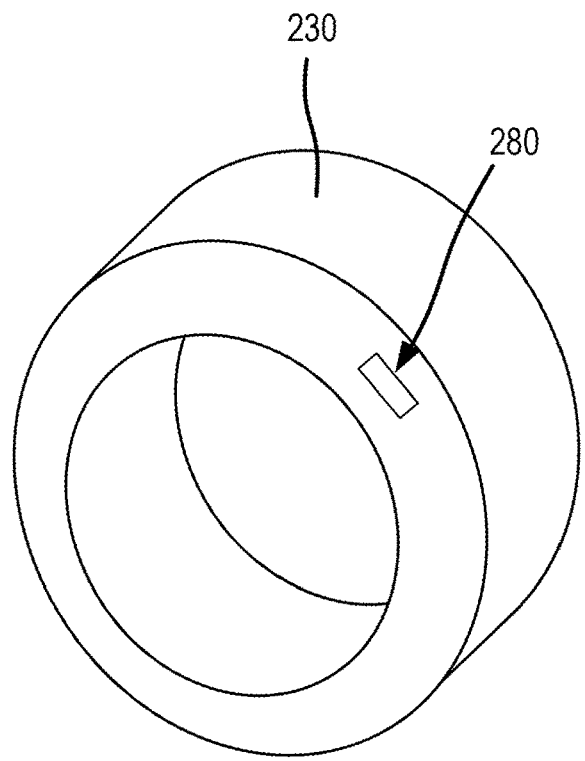
FIG. 5 illustrates a perspective view of an eccentric sleeve comprising a rotation assistance feature comprising a slot formed in the sleeve, in accordance with various embodiments.

With reference to FIG. 5, a first sleeve 230 is illustrated, in accordance with various embodiments. First sleeve 230 may be similar to first sleeve 130 of FIG. 1, except that first sleeve 230 further comprises a rotation assistance feature 280. Rotation assistance feature 280 may comprise a slot disposed in an exposed surface of first sleeve 230, wherein a tool may be inserted to provide a mechanical advantage in turning first sleeve 230.

Figure 6:
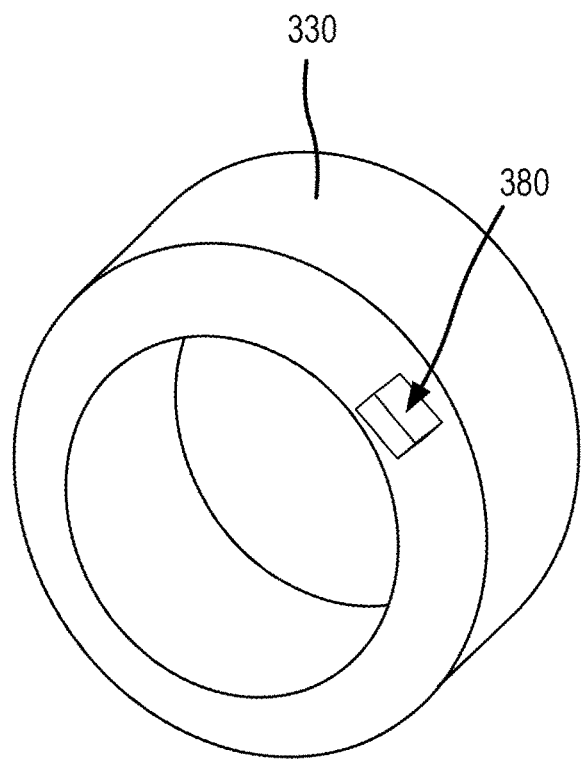
FIG. 6 illustrates a perspective view of an eccentric sleeve comprising a rotation assistance feature comprising a boss feature extending from the sleeve, in accordance with various embodiments.

With reference to FIG. 6, a first sleeve 330 is illustrated, in accordance with various embodiments. First sleeve 330 may be similar to first sleeve 130 of FIG. 1, except that first sleeve 330 further comprises a rotation assistance feature 380. Rotation assistance feature 380 may comprise a boss feature extending from an exposed surface of first sleeve 330. Rotation assistance feature 380 may be used to provide a mechanical advantage in turning first sleeve 330.

Figure 7:
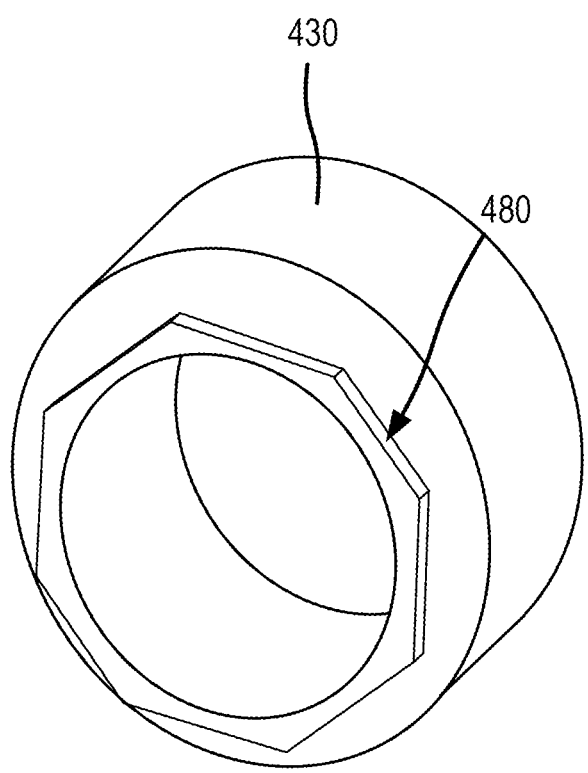
FIG. 7 illustrates a perspective view of an eccentric sleeve comprising a rotation assistance feature comprising a flange, in accordance with various embodiments.

With reference to FIG. 7, a first sleeve 430 is illustrated, in accordance with various embodiments. First sleeve 430 may be similar to first sleeve 130 of FIG. 1, except that first sleeve 430 further comprises a rotation assistance feature 480. Rotation assistance feature 480 may comprise a flange extending from an exposed surface of first sleeve 430. Rotation assistance feature 480 may be used to provide a mechanical advantage in turning first sleeve 430. Rotation assistance feature 480 may comprise a flange configured to receive a tool, such as a socket or a wrench for example, for turning first sleeve 430. For example, rotation assistance feature 480 may comprise a polygonal shape, such as a square, a hexagon, an octagon, or any other geometry suitable for receiving or being captured by a tool for turning first sleeve 430.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one, and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C. Different cross-hatching is used throughout the figures to denote different parts, but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are only illustrated in the figures to help to improve understanding of embodiments of the present, representative disclosure.

Any reference to attached, fixed, connected, or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas, but not necessarily to denote the same or different materials. In some cases, reference coordinates may be specific to each figure.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements, but it may also include other elements not expressly listed or inherent to such process, method, article, or apparatus.

What is claimed is:

1. An adjusting arrangement, comprising:
   a position-sensitive component comprising a first aperture and a second aperture;
   a first sleeve comprising a first eccentric aperture, wherein the position-sensitive component is configured to receive the first sleeve in the first aperture;
   a second sleeve comprising a second eccentric aperture, wherein the first sleeve is configured to receive the second sleeve in the first eccentric aperture;
   a first rod configured to extend through the first aperture, the first rod comprising a first centerline axis;
   a second rod configured to extend through the second aperture, the second rod comprising a second centerline axis;
   wherein rotation of the first sleeve with respect to the position-sensitive component and the second sleeve is configured to drive rotation of the position-sensitive component about the second centerline axis; and
   a mounting structure, wherein the first rod and the second rod are coupled to the mounting structure.

2. The adjusting arrangement of claim 1, wherein the first centerline axis is parallel to the second centerline axis; and/or wherein the first sleeve is friction fit into the first aperture.

3. The adjusting arrangement of claim 2, further comprising a relief cut disposed in the position-sensitive component, the relief cut forming two opposing fingers whereby a size of the first aperture is adjustable for compressing and releasing the first sleeve.

4. The adjusting arrangement of claim 3, wherein the two opposing fingers are pulled apart to release the first sleeve.

5. The adjusting arrangement of claim 4, wherein an inner diameter of the first aperture is less than an outer diameter of the first sleeve in response to the two opposing fingers being in a natural state.

6. The adjusting arrangement of claim 1, further comprising a nut configured to thread onto the first rod to secure the second sleeve within the first sleeve.

7. A method for installing a position-sensitive component, comprising:
   disposing a first sleeve comprising a first eccentric aperture into a first aperture disposed in the position-sensitive component;
   disposing a second sleeve comprising a second eccentric aperture into the first eccentric aperture;
   rotating the first sleeve with respect to the second sleeve to adjust an angular position of the position-sensitive component; and
   compressing the first sleeve between opposing fingers of the position-sensitive component to thereby provide a friction lock to maintain a relative angle of the first sleeve with respect to the position-sensitive component.

8. The method of claim 7, further comprising disposing a first rod to extend through the second eccentric aperture.

9. The method of claim 8, further comprising disposing a second rod to extend through a second aperture disposed in the position-sensitive component, wherein the first rod is fixed with respect to the second rod.

10. The method of claim 7, further comprising expanding the opposing fingers of the position sensitive component to enlarge the first aperture before moving the first sleeve into the first aperture.

11. The method of claim 7, further comprising, in response to rotating the first sleeve with respect to the second sleeve, rotating the position-sensitive component about a second rod.

12. A locking adjusting arrangement, comprising:
    a position-sensitive component comprising a first aperture disposed in a body of the position-sensitive component, wherein the body comprises opposing fingers at least partially defining the first aperture;
    a first sleeve comprising a first eccentric aperture, wherein the first sleeve is configured to be received into the first aperture; and
    a second sleeve comprising a second eccentric aperture, wherein the second sleeve is configured to be received into the first eccentric aperture;
    wherein the first sleeve is compressed between the opposing fingers thereby providing a friction lock to maintain a relative angle of the first sleeve with respect to the position-sensitive component.

13. The locking adjusting arrangement of claim 12, wherein rotation of the first sleeve with respect to the position-sensitive component and the second sleeve is configured to drive rotation of the position-sensitive component.

14. The locking adjusting arrangement of claim 12, wherein the first sleeve comprises a rotation assistance feature.

15. The locking adjusting arrangement of claim 12, wherein a diameter of the first aperture is less than a diameter of the first sleeve in response to the opposing fingers moving to a natural state.

16. The locking adjusting arrangement of claim 15, wherein the body and the opposing fingers comprise a single, monolithic structure.

17. The locking adjusting arrangement of claim 12, further comprising a first rod, wherein the second eccentric aperture is configured to receive the first rod; and/or further comprising:
    a second aperture disposed in the body; and
    a second rod, wherein the second aperture is configured to receive the second rod.

18. The locking adjusting arrangement of claim 12, wherein the first eccentric aperture is eccentric relative to an outer diameter surface of the first sleeve.

19. The locking adjusting arrangement of claim 12, wherein the second eccentric aperture is eccentric relative to an outer diameter surface of the second sleeve.

* * * * *